United States Patent Office 3,256,343
Patented June 14, 1966

3,256,343
PRODUCTION OF HALOGEN DERIVATIVES
Ernest Bryson McCall, Llangollen, and William Cummings, Marford, Wales, assignors to Monsanto Chemicals Limited, London, England, a British company
No Drawing. Filed Jan. 28, 1963, Ser. No. 254,454
Claims priority, application Great Britain, Feb. 1, 1962, 3,851/62
6 Claims. (Cl. 260—612)

This invention relates to a new process by which a halogen atom can be introduced into an organic compound.

The introduction of a halogen atom, such as a chlorine or fluorine atom, into an aromatic nucleus does, in principle, constitute an important reaction, and halogeno-substituted aromatic compounds have many uses. A new halogenation reaction is described in copending application Serial No. 219,756, filed August 27, 1962, which is concerned with a process for the production of a halogeno-substituted aromatic compound. In said process, an aromatic sulfonyl halide is subjected to thermal decomposition in the presence of certain solvents such that sulfur dioxide is evolved from a sulfonyl halide group, and the halogen appears as a substituent in the aromatic nucleus.

It has now been found that an effective way of carrying out the thermal decomposition in certain instances is in the vapor phase; this procedure is of particular value in the production of fluoro-substituted aromatic compounds.

The process of the invention is one for the production of a halogeno-substituted aromatic compound, in which the vapor of an aromatic sulfonyl halide is subjected to thermal decomposition such that sulfur dioxide is evolved from a sulfonyl halide group, and the halogen atom appears as a substituent in the aromatic nucleus.

For instance, by the process of the invention, fluorobenzene can be obtained from benzenesulfonyl fluoride.

Certain materials have been found to catalyze the thermal decomposition of the aromatic sulfonyl halide, and preferably the process of the invention is carried out in the presence of one of these.

The aromatic sulfonyl halide that is employed as starting material is a compound having a sulfonyl halide group linked to an aromatic nucleus; that is to say, a cyclic system that is stabilized by the presence of non-localized π-electrons, for instance, a benzene, diphenyl, naphthalene, benzofuran, thiophene or pyridine nucleus.

By using the appropriate sulfonyl halide, a chosen halogen atom can be introduced; for instance, a sulfonyl chloride leads to the introduction of a chlorine atom; a sulfonyl bromide to a bromine atom; a sulfonyl iodide to an iodine atom; and a sulfonyl fluoride to a fluorine atom. The last-named replacement is particularly valuable since the preparation of the lower fluorinated compounds in a pure state is quite difficult when direct methods are employed. The alternative indirect methods, such as diazo replacement, give relatively low yields in many instances.

Similarly, a mono-, di-, tri- or other halogeno-substituted aromatic compound can be obtained by use of a mono-, di-, tri- or other appropriate sulfonyl halide. Normally the halogen atom takes the position formly occupied by the sulfonyl halide group. The process is useful in the production of di-halogeno compounds, such as di-fluoro compounds from di-sulfonyl halides or monohalogen-substituted mono-sulfonyl halides. Said process is particularly valuable in the production of m-di-halogeno compounds.

The process is normally carried out at an elevated temperature, for example a temperature higher than 200° C., and preferably above 250° C. Good results are obtained using a reaction temperature in the range of 300° C. to 400° C., for instance, between 325° C. and 375° C.

Where the thermal decomposition of the aromatic sulfonyl halide is conducted in the presence of a catalyst, suitable catalysts are generally any of those, and particularly the metals or metal compounds, specified as catalysts in the process described in British Patent No. 959,605. Palladium, platinum, and copper and their compounds, for example, their oxides and salts, for instance, the halides, are very effective catalysts in the process of the present invention. The catalyst is generally employed in a form that is pervious to the vapor of the sulfonyl halide, and in many instances the catalyst can conveniently be absorbed on an inert support, for example charcoal or kieselguhr, in powder or granular form.

The process is normally operated at atmospheric pressure, so that the reaction temperature will usually be above the normal boiling point of the aromatic sulfonyl halide. Where a lower reaction temperature than this is required, however, the process can be operated below atmospheric pressure.

Good results are obtained by diluting the vapor of the aromatic sulfonyl halide with an inert gas, for example, nitrogen or argon, before subjecting said halide to thermal decomposition. There can be employed, for example, from 1 volume to 10 volumes of the inert gas per volume of the aromatic sulfonyl halide vapor, for instance from 3 to 5 volumes.

In certain instances, the vapor of the aromatic sulfonyl halide can, with advantage, be subjected to thermal decomposition in the presence of the corresponding free halogen. Thus, in the production of chlorobenzene or fluorobenzene, there can be employed, respectively, benzenesulfonyl chloride vapor containing chlorine, or benzenesulfonyl fluoride vapor containing fluorine (and optionally, in each instance, an inert diluent gas).

The range of halogeno-substituted aromatic compounds that can be produced by the process of the present invention, starting from an appropriate sulfonyl halide, is broadly the same as that described in detail in said copending application Serial No. 219,756, to which reference is accordingly directed. Some specific examples which may be mentioned here are chlorobenzene; bromobenzene; fluorobenzene; o-, m- and p-difluorobenzene; o-dichlorobenzene; m-dichlorobenzene; m-dibromobenzene; m-chlorobromobenzene; p-dibromobenzene; 2,4-dibromotoluene; 2-chloro-6-iodoethylbenzene; p-chlorodiphenyl; m-bromodiphenyl; 2,4-difluorodiphenyl; 2,2-difluorodiphenyl ether; 2-bromonaphthalene; 1,5-dichloronaphthalene; 1,3,6-tribromonaphthalene; and 4-bromodibenzothiophene.

Isolation of the required halogeno-substituted aromatic compound from the products of the thermal decomposition of the aromatic sulfonyl halide can normally be effected by a conventional method, for example by fractional condensation or distillation. Under certain conditions, some of the aromatic sulfonyl halide can be recovered unchanged, and, if desired, can be recycled to the process.

The process of the invention is illustrated by the following examples.

*Example 1*

This example describes the production of chlorobenzene from benzenesulfonyl chloride.

Benzenesulfonyl chloride was vaporized at a rate of 0.065 gram per minute into a stream of nitrogen flowing at 25 cc. per minute. The gases were led through a U-tube having an internal diameter of 1.25 cm. and containing 10 grams of powdered charcoal on which was supported 5% of its weight of palladium, thus giving a catalyst bed 16 cm. in length. The U-tube was immersed in a bath containing a heat-transfer fluid at a temperature of 330° C.

The gas stream emerging from the U-tube was led successively through a water-cooled condenser, an ice-cooled receiver and a solution of sodium hydroxide. The less volatile components were collected in the receiver, while sulfur dioxide, the principal by-product of the reaction, was absorbed in the sodium hydroxide solution. Hydrogen chloride, a minor by-product, was likewise absorbed.

A total of 13.5 grams of benzenesulfonyl chloride was vaporized (over a period of 206 minutes). Nitrogen alone was then passed through the apparatus for a further 30 minutes. The liquid which had collected in the receiver was washed with sodium hydroxide solution. It was dried over anhydrous magnesium sulfate, and 6.0 grams of chlorobenzene (70% yield on benzenesulfonyl chloride) were then isolated from it by fractional distillation.

The sodium hydroxide washings were added to the sodium hydroxide solution in which the bulk of the sulfur dioxide and hydrogen chloride had been absorbed, and the total amount of each gas produced during the process was determined by analysis of the solution. The sulfur dioxide was equivalent to 85%, and the hydrogen chloride to 9.6%, of the benzenesulfonyl chloride.

*Example 2*

This example describes the production of fluorobenzene from benzenesulfonyl fluoride.

The apparatus and procedure employed were essentially the same as those described in Example 1.

As catalyst, there were employed 9.2 grams of a charcoal powder supporting 5% of its weight of copper (giving a catalyst bed 14.5 cm. in length) maintained at a temperature of 360° C. A total of 14.4 grams of benzenesulfonyl fluoride was vaporized over a period of 150 minutes into nitrogen flowing at 15 cc. per minute.

Twenty percent of the benzenesulfonyl fluoride vaporized was recovered as such, and, in the process, there were produced 2.7 grams of fluorobenzene having a boiling point of 78–80° C., and sulfur dioxide, equivalent respectively to 31% and 69% of the benzenesulfonyl flouride vaporized.

*Examples 3–9*

Following the detailed procedure set forth in Example 1, and employing the apparatus described therein, the aromatic sulfonyl halides hereinafter named are subjected to thermal decomposition in the vapor phase to yield the named halogeno-substituted aromatic compounds.

Example 3—

Halide: benzene-m-disulfonyl chloride
Product: m-dichlorobenzene

Example 4—

Halide: benzenesulfonyl bromide
Product: bromobenzene

Example 5—

Halide: naphthalene-1,5-disulfonyl chloride
Product: 1,5-dichloronaphthalene

Example 6—

Halide: naphthalene-2,7-disulfonyl chloride
Product: 2,7-dichloronaphthalene

Example 7—

Halide: toluene-2,4-disulfonyl bromide
Product: 2,4-dibromotoluene

Example 8—

Halide: 4,4′-diphenyldisulfonyl chloride
Product: 4,4′-dichlorodiphenyl

Example 9—

Halide: p-isopropylbenzenesulfonyl chloride
Product: p-chlorocumene.

While the invention has been described herein with regard to several specific embodiments, it is not so limited. It is to be understood that modifications and variations of the invention, obvious to those skilled in the art, may be made without departing from the spirit and scope of said invention.

What is claimed is:

1. A process which comprises heating the vapor of an aromatic sulfonyl halide of the formula, $$R(SO_2X)_n$$

wherein $n$ is an integer from 1 to 3, X represents halogen, and R is selected from the group consisting of phenyl, naphthyl, biphenylyl, terphenylyl, quaterphenylyl, phenoxyphenyl and the substituted derivatives thereof wherein the substituents are selected from the group consisting of alkyl of 1 to 12 carbon atoms, alkoxy of 1 to 6 carbon atoms, nitro and halogen, and each $(SO_2X)$ groups is attached to a nuclear carbon atom of R, said vapor being heated at a temperature of from about 200° C. to about 400° C. and in the presence of a catalyst selected from the group consisting of copper, platinum and palladium.

2. A process as defined in claim 1 wherein said temperature is from about 300° C. to about 400° C.

3. A procescs as defined in claim 1 wherein R is a monocarbocyclic radical, and $n$ is 1.

4. A process as defined in claim 1 wherein R is a dicarbocyclic radical, and $n$ is 2.

5. A process as defined in claim 1 wherein the vapor of the aromatic sulfonyl halide is diluted with an inert gas prior to heating.

6. A process as defined in claim 5 wherein from 1 to 10 volumes of the inert gas diluent is employed per volume of aromatic sulfonyl halide vapor.

References Cited by the Examiner

UNITED STATES PATENTS 2,900,297  8/1959  Wygant  260—650 X

FOREIGN PATENTS 98,433  7/1898  Germany.
740,677  11/1943  Germany.

OTHER REFERENCES

Gilman, "Organic Chemistry," vol. I, p. 900 (1943).

LEON ZITVER, *Primary Examiner.*

K. H. JOHNSON, K. V. ROCKEY, *Assistant Examiners.*